United States Patent [19]
Singer

[11] Patent Number: 5,407,515
[45] Date of Patent: Apr. 18, 1995

[54] LAMINATION METHOD AND APPARATUS USING EDGE BONDING

[76] Inventor: Steven Singer, 269 Shakespeare Drive, Waterloo, Ontario, Canada, N2L 2T8

[21] Appl. No.: 168,207

[22] Filed: Dec. 17, 1993

[51] Int. Cl.⁶ .............................................. B32B 31/00
[52] U.S. Cl. .................................... 156/277; 156/299; 156/275.7; 156/283; 156/380.9; 156/499; 156/548
[58] Field of Search ................. 156/299, 391, 63, 291, 156/556, 538, 548, 283, 499, 380.9, 275.7, 277, 272.2; 12/147 R

[56] References Cited

U.S. PATENT DOCUMENTS

| | | |
|---|---|---|
| 2,698,272 | 12/1954 | Clapp .................................. 156/299 |
| 4,183,978 | 1/1980 | Hefele . |
| 4,333,980 | 6/1982 | Russell . |
| 4,430,142 | 2/1984 | Ochi et al. ......................... 156/274.4 |
| 4,629,645 | 12/1986 | Inoue . |
| 4,655,868 | 4/1987 | Hefele . |
| 4,776,916 | 10/1988 | Prunesti . |
| 4,842,908 | 6/1989 | Cohen . |
| 4,919,746 | 4/1990 | Celia .................................... 156/556 |
| 5,169,469 | 12/1992 | Feeley ................................. 156/248 |
| 5,283,106 | 2/1994 | Seiler . |

FOREIGN PATENT DOCUMENTS 46-5413  2/1971  Japan ................................. 156/277

Primary Examiner—Chester T. Barry
Attorney, Agent, or Firm—R. Craig Armstrong

[57] ABSTRACT

A method and apparatus for laminating two pieces of material involves edge bonding. The method includes the steps of: placing pieces of a first material into a fixture on a work platform, depositing a powder adhesive onto an edge zone of each first material piece, curing the adhesive to a form ready for bonding, placing pieces of a second material into the fixture such that each sits above a piece of the first material, applying heat and pressure to the fixture to press each piece of first material against each piece of second material, and removing the finished pieces from the fixture. The method utilizes a rotatable table carrying six equiangularly-positioned fixtures, as well as six workstations positioned equiangularly around the table. In the described embodiment, three of the workstations are automated: a mesh screen mechanism for depositing the powder adhesive, a bank of quartz infrared lamps for curing the adhesive, and a press mechanism for applying the heat and pressure to the pieces of material in the fixture.

3 Claims, 10 Drawing Sheets

LAMINATION METHOD AND APPARATUS USING EDGE BONDING

The invention is a lamination method and apparatus, and more particularly, a method and apparatus for laminating two materials of matching shape using edge bonding.

Lamination of two materials usually involves placing an adhesive over the whole of the abutting common surface of the two materials. While this approach creates a very strong bond between the materials, it has several disadvantages. For one thing, the amount of adhesive consumed by bonding all of the common surface is substantially more than that consumed by bonding only the edges of the two materials. Another disadvantage is that one of the bonded materials may become distorted when the laminated material is flexed. For instance, when leather is laminated to a substrate such as foam sponge, the leather may distort when the laminated material is flexed to form, for instance, a car seat. Bonding only the edge of the leather to the edge of the foam sponge allows the central regions of the two materials to slide slightly relative to each other when the laminated material is flexed, giving a more natural look to the leather in the flexed configuration.

Lamination using edge bonding is known. For instance, U.S. Pat. No. 3,998,684, granted on Dec. 21, 1976 to K. L. McRight, discloses a method of manufacturing an air cushion in which stencils are placed over two rubber sheets and adhesive applied to openings in the stencils, followed by pressing the two sheets together. The method of this reference uses a separate stencil with each of the pair of rubber sheets; one of each pair of stencils is left between the sheets and thus consumed in this method. Also, in this method the adhesive is not applied to the edges of the rubber sheets, with the result that those parts of the sheets outside of the adhesive regions have to be later trimmed from the air cushion. It would be an advantage to have a method in which a stencil was not required, and in which an adhesive was applied to the edge of the pieces of material to obviate later trimming. Less waste results if materials are cut prior to bonding rather than after bonding, since unbonded material can be recycled.

Another reference of interest to the subject invention is U.S. Pat. No. 3,383,263, granted to M. STORTI on May 14, 1968. This reference uses a circular screen printer to apply adhesive in a pattern to a belt; the adhesive pattern is then transferred onto the surface of a finishing fabric prior to the surface of that fabric being pressed against a backing fabric. In the result, the two fabrics are bonded together by the pattern of adhesive. Although the Shorti reference discloses that an adhesive may be patterned using a screen printing process, it does not disclose the concept of using such a process for edge-bonded lamination.

The subject invention relates to both a method and an apparatus for edge-bonded lamination of one or more pieces of a first material with one or more pieces of a second material having corresponding shapes. The method involves a first step of placing the one or more pieces of the first material into one of a series of equally-spaced fixtures on a movable work platform. Each fixture has a set of recessed areas. One recessed area in each fixture has a shape corresponding to that of one of the pieces of the first material. A second step involves depositing a powder adhesive on an edge zone of each of the one or more pieces of the first material. In a next step the powder adhesive is cured with suitable light from a lamp or lamps. The one or more pieces of the second material are then placed into the fixture; each piece of the second material is placed onto a piece of the first material having a corresponding shape. The edge of each piece of second material is aligned with the edge of the corresponding piece of first material. A suitable pressure is then applied for a suitable time to allow the adhesive on the edge zone of each piece of the first material to bond that piece to the corresponding piece of the second material. A final step involves removing the one or more pieces of bonded material from the fixture.

Each of the six steps may be performed at one of six workstations equiangularly positioned around a rotatable table carrying six equiangularly-positioned fixtures. The powder adhesive deposition step may involve two steps. One of those steps involves lowering onto the fixture a mesh screen having a surface pattern defined by a series of open apertures and blocked apertures. The open apertures on the lowered screen are adjacent an edge zone on each of the one of more pieces of the first material. The other step involves moving powder adhesive across the top of the lowered screen such that the adhesive drops through the open apertures onto the edge zone of each of the one or more pieces of the first material below.

The apparatus of the subject invention has a movable work platform carrying at least six equally-spaced fixtures of the same shape. Each of the fixtures has a series of recessed areas identical in shape and location to those on each other fixture. Each recessed area on a fixture has a shape corresponding to that of one of the pieces of the first material. The apparatus further has a mesh screen mechanism. The screen mechanism has a screen adapted to be lowered onto a fixture at a workstation such that a series of open apertures in the screen are adjacent an edge zone on each of the one or more pieces of the first material in the fixture. The open apertures guide the placement of a powder adhesive on the lowered screen. The apparatus also comprises a curing light source for directing light at the fixture at a sequential workstation. The light transforms the powder adhesive into a state ready for bonding. The apparatus further comprises a press mechanism with a press surface adapted to be lowered onto the fixture at another sequential workstation, the surface pressing each piece of the second material against each corresponding piece of the first material.

The movable work platform may be a rotatable table carrying six equiangularly-positioned fixtures and having six workstations equiangularly positioned around it. The fixtures may be sized to accept leather as the first material and foam sponge as the second material.

The subject invention will next be described by means of a preferred embodiment utilizing the accompanying drawings, in which.

Figure 1:
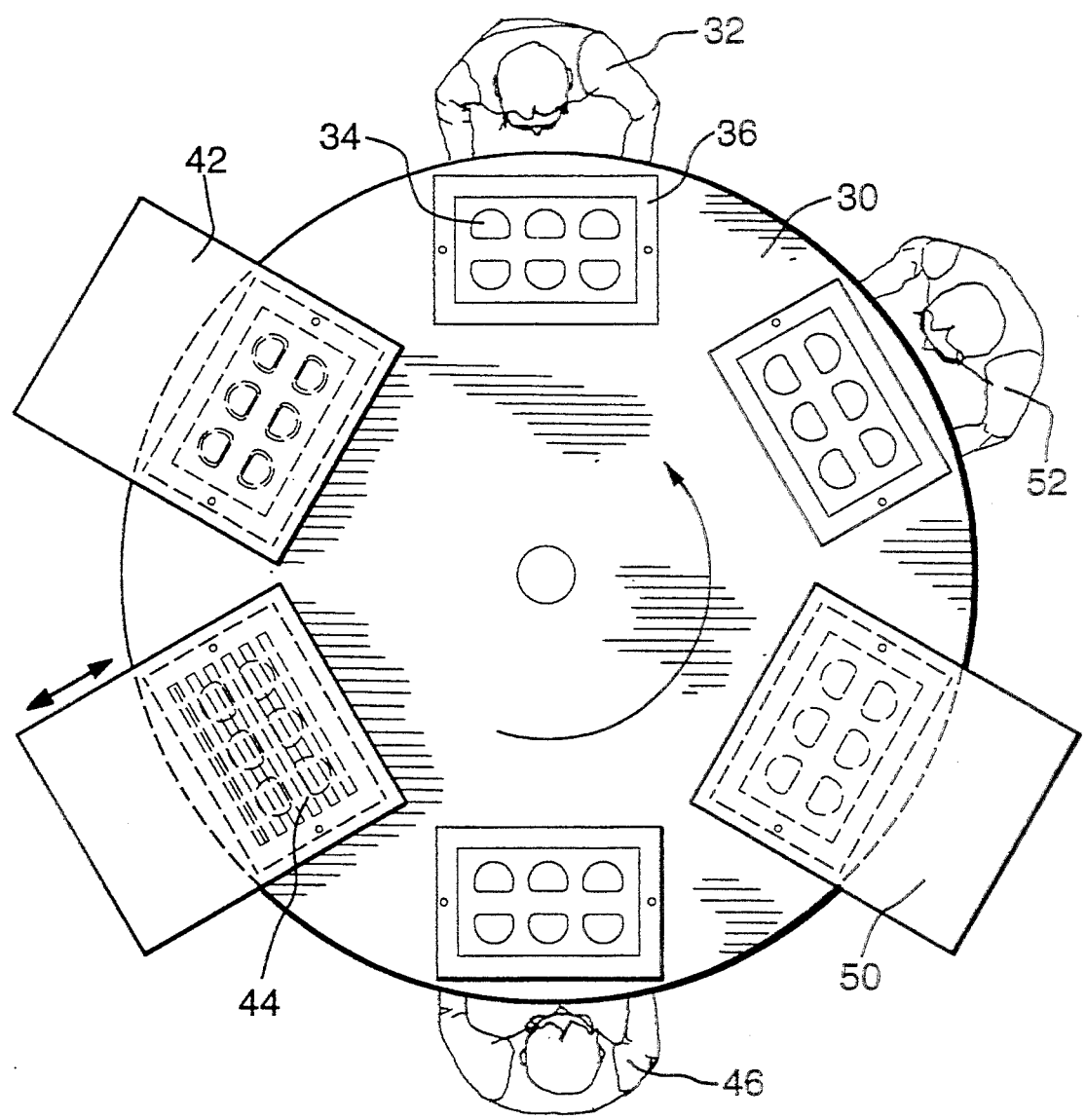
FIG. 1 is a plan view of the apparatus of the preferred embodiment, the view showing the six workstations of the apparatus.
Figure 2:
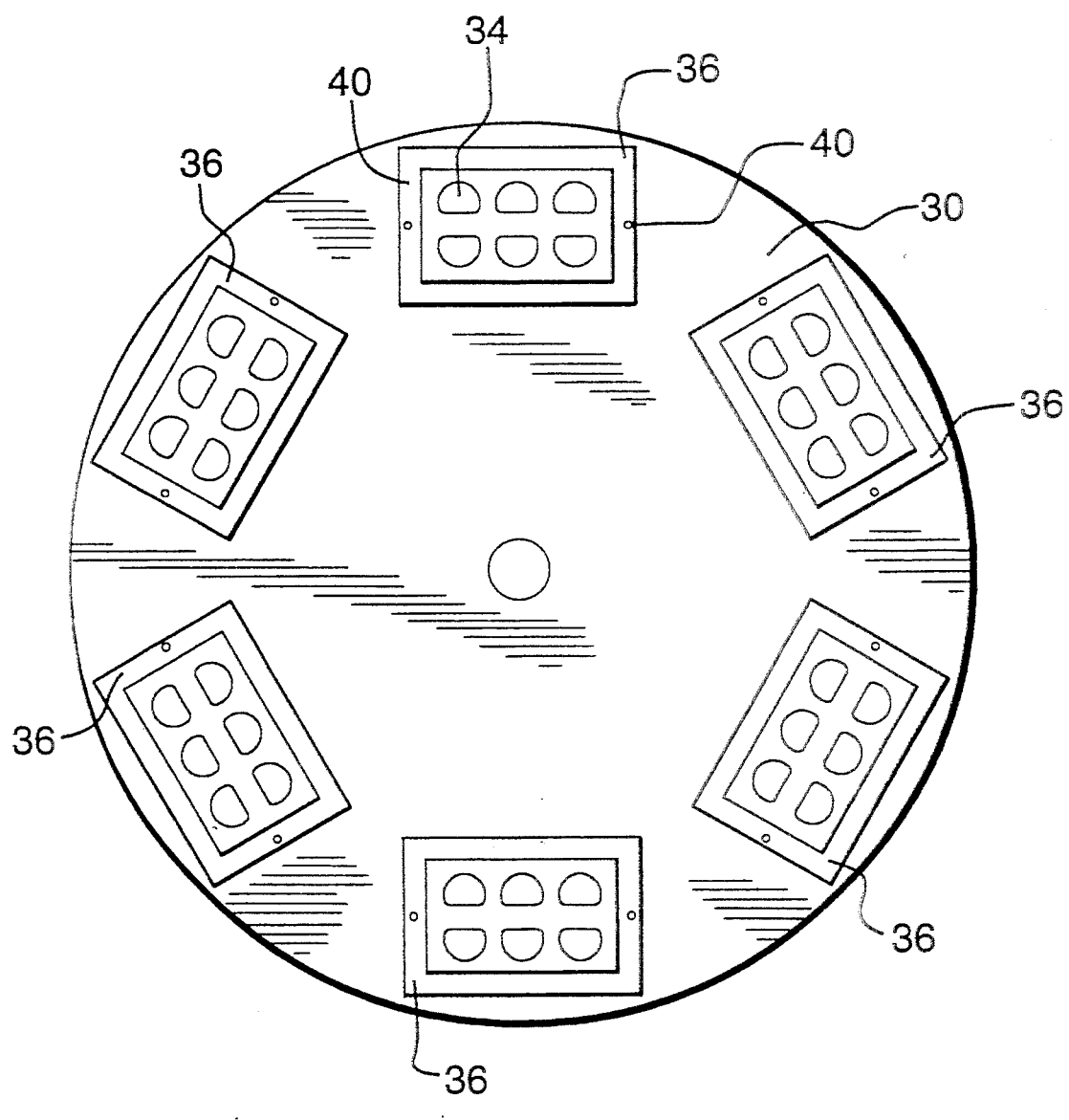
FIG. 2 is a plan view of the table of the apparatus, the view showing six fixtures mounted on the table.
Figure 3:
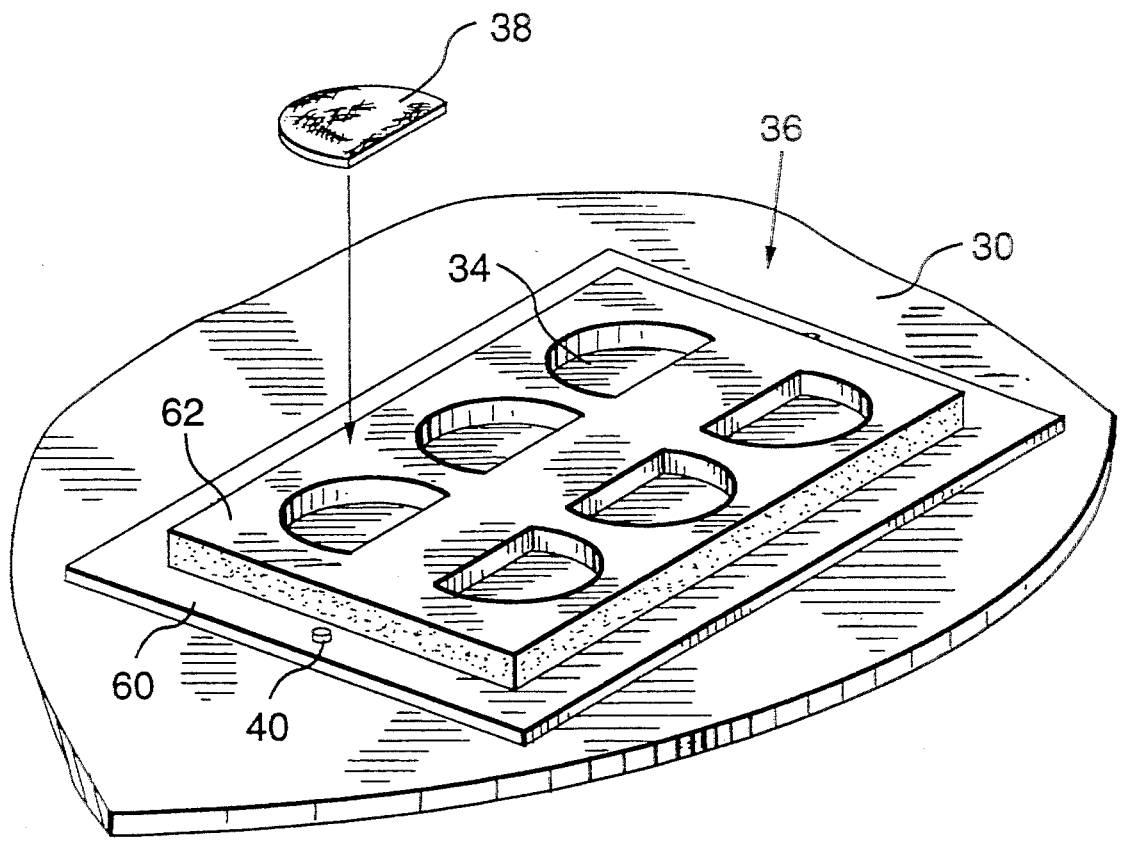
FIG. 3 is a perspective view of one of the fixtures, a piece of a first material being oriented for placement in one of the cavities of the fixture.
Figure 4:
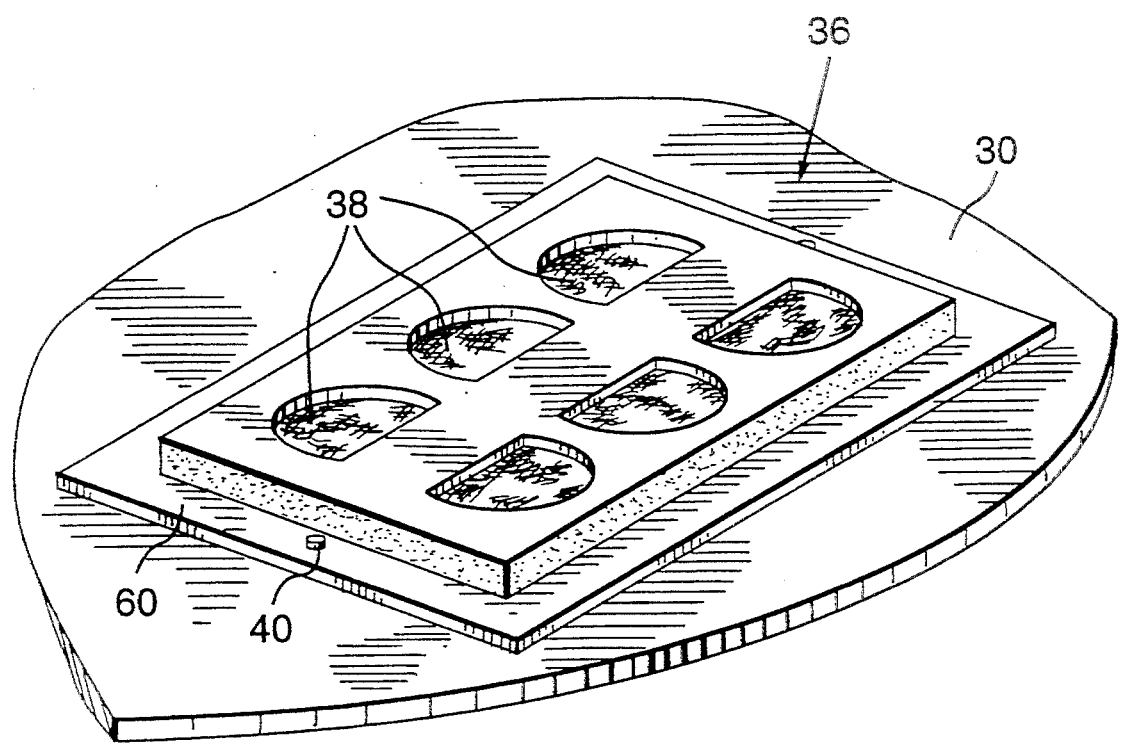
FIG. 4 is a perspective view similar to FIG. 3 but showing the cavities each filled with a piece of the first material.

As illustrated in the plan views of FIGS. 1 and 2, the preferred embodiment of the apparatus includes a rotatable circular table 30 with a diameter of 132 inches. The table 30 is rotatably driven between six equiangular positions, each representing a workstation. As illustrated in FIG. 1, three of the workstations each involve a manual operation and the other three workstations each involve an automated operation. At a first workstation, a worker 32 fills each of six cavities 34 in a fixture 36 with a piece of leather 38 pre-cut to a shape matching the shape of the cavity. Six of the fixtures 36, each 36 inches long and 24 inches wide, are equiangularly-positioned around the table 30, as shown in FIG. 2. Each fixture 36 has a pair of centred end holes adapted to fit over a respective pair of pins 40 extending upwardly from table 30. The top face of table 30 is formed from aluminum 0.125 inches thick.

At a second workstation, a mesh screen mechanism 42 is used to apply a layer of powder adhesive along a peripheral strip on each piece of leather 38. At a third workstation, a bank of lamps 44 is used to cure the peripheral strip of powder adhesive on each piece of leather 38; the adhesive is thereby transformed into a state ready for bonding. At a fourth workstation, a worker 46 places a piece of foam sponge 48 into each cavity 34. Each foam sponge piece 48 has a shape that matches the shape of the leather piece 38 onto which it is placed. At a fifth workstation, a press mechanism 50 applies a suitable pressure for a time sufficient to bond each piece of leather 38 to each piece of foam sponge 48. The bonded pieces are then removed from the fixture 36 by a worker 52 at a sixth workstation.

Each fixture 36 is formed from a masonite base sheet 60, having a pair of centred end holes adapted to fit over a pair of pins 40 extending upwardly from table 30, and a sheet of heat-resistant foam 62. The cavities 34 are cut into foam sheet 62 before that sheet is glued to base sheet 60. Each of the cavities 34 has a shape corresponding to the shape of one of the pieces being laminated; although all of the cavities in foam sheet 62 have the same shape, the cavities in a foam shape might have diverse shapes.

Figure 17:
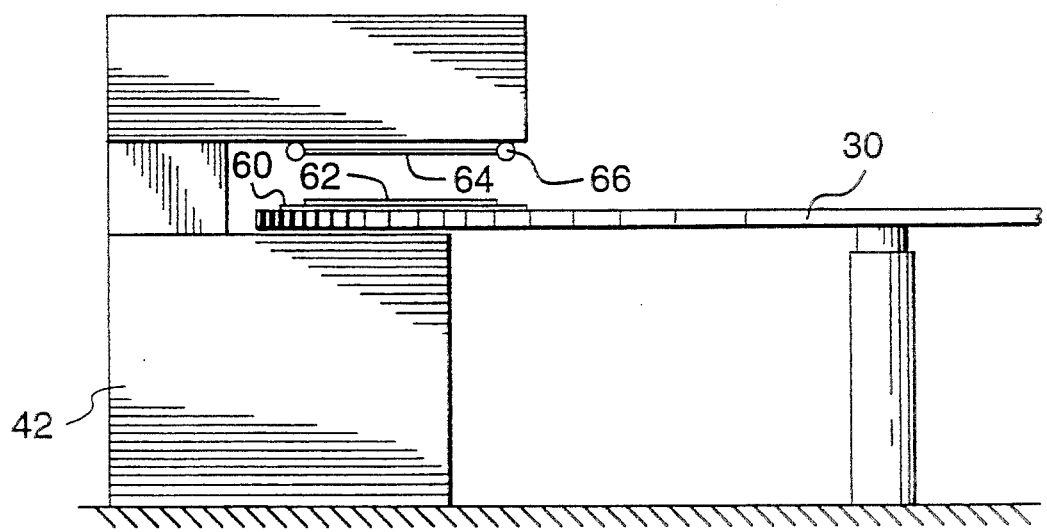
FIG. 17 is a side view of the workstation having the powder adhesive screen mechanism, the mechanism being shown in a raised position.
Figure 18:
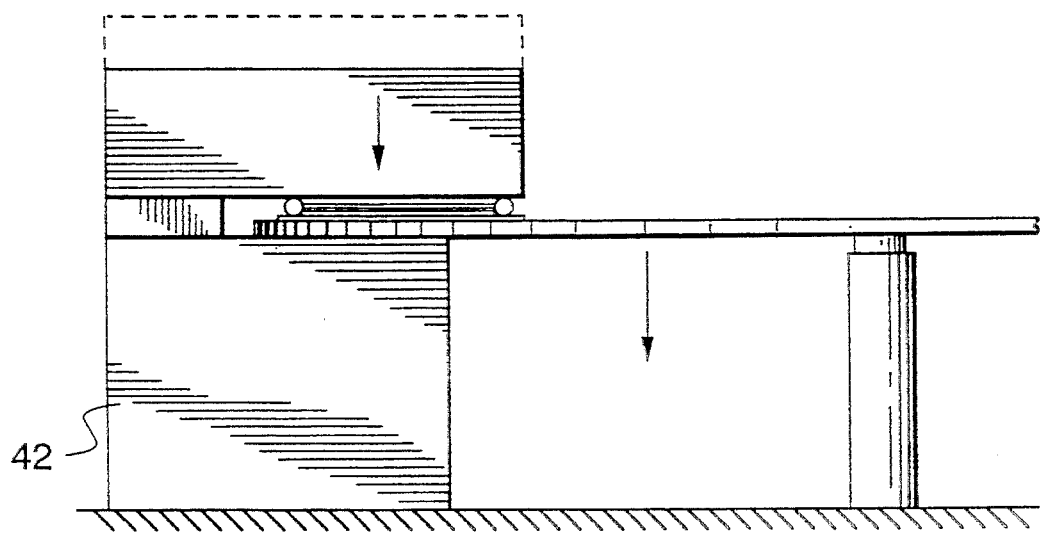
FIG. 18 is a side view of the workstation of FIG. 17, the screen mechanism being shown in a lowered position.

With reference to FIGS. 3 to 8, six leather pieces 38 are manually inserted into the respective cavities 34 in fixture 36 at a first workstation. Each leather piece has been pre-cut to have a shape corresponding closely to that of a cavity 34. Table 30 is then rotated 60°, and a mesh screen 64 having a tubular aluminum frame 66 descends onto fixture 36 at the second workstation. Frame 66 is sized larger than foam sheet 62 but smaller than masonite base sheet 60. With frame 66 resting on base sheet 60, screen 64 extends approximately 0.03 inches above the top of heat-resistant foam sheet 62. Table 30, which is mounted so as to allow for slight vertical movement, is pushed downward approximately 0.25 inches onto the bed of mesh screen mechanism 42, as illustrated in FIGS. 17 and 18. Screen 64 is a fabric screen which has a portion of its apertures open and the remaining portion blocked. The open-aperture design is created using a process similar to the masking process that is used to create a screen for silk screening of clothing. In that process the whole screen is immersed in an emulsion, which hardens when exposed to light. A pattern is placed over the screen to block light from those apertures that are to be kept open. Moisture or ionized air may be applied to the open apertures to prevent static electricity being built-up by powder adhesive flowthrough.

Figure 5:
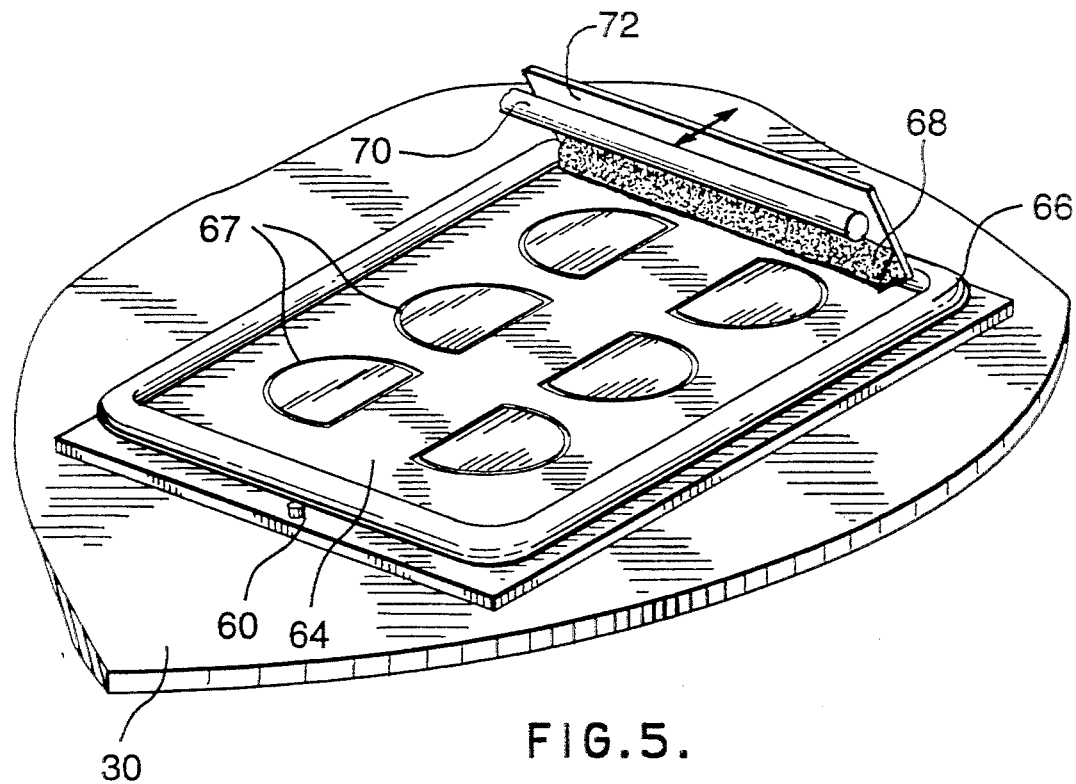
FIG. 5 is a perspective view similar to FIG. 4 but additionally showing a powder adhesive screen resting on the fixture.
Figure 6:
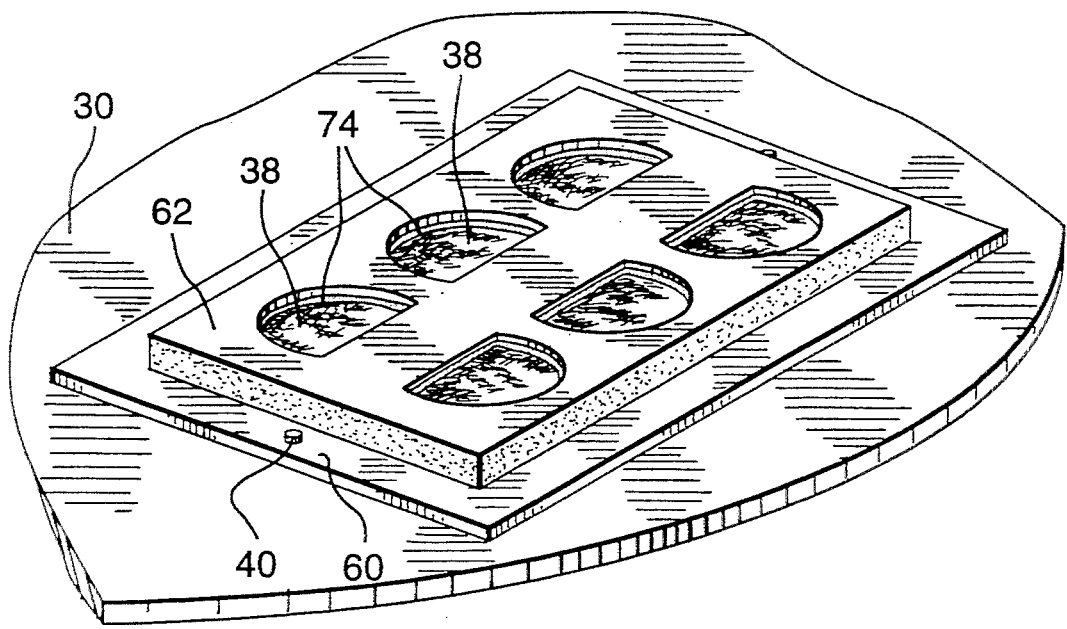
FIG. 6 is a perspective view similar to FIG. 5 but showing the screen removed after deposition of the powder adhesive.

FIG. 5 illustrates the pattern of open apertures 67 in mesh screen 64. That pattern has been created to correspond closely with a peripheral edge strip within each of the cavities 34 in foam sheet 62. With a leather piece 38 positioned in each of the cavities 34, a powder adhesive 68 is fed through a pipe 70 onto one end of mesh screen 64. An advantage of powder adhesive over liquid adhesive is that the former can be used to bond porous materials. A urethane wiper 72 moves powder adhesive 68 across the surface of screen 64. Adhesive 68 drops through open apertures 67 onto a peripheral edge zone 74 on each piece of leather 38, as illustrated in FIG. 6. Frame 66 of mesh screen mechanism 42 is then raised approximately 4 inches; that action allows table 30 to rise back to its rotational height which is approximately 0.25 inches above the bed of mechanism 42.

Figure 13:
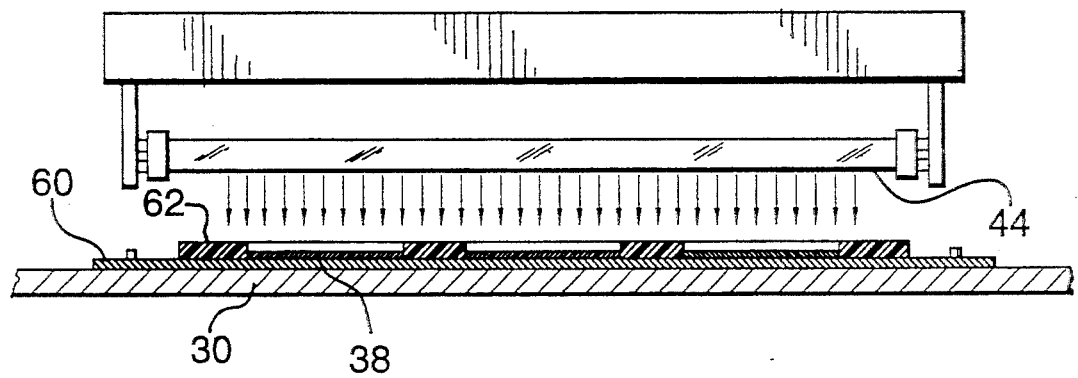
FIG. 13 is a sectioned side view similar to FIG. 10, but additionally showing lamps emitting light to cure the powder adhesive on the pieces of first material.
Figure 19:
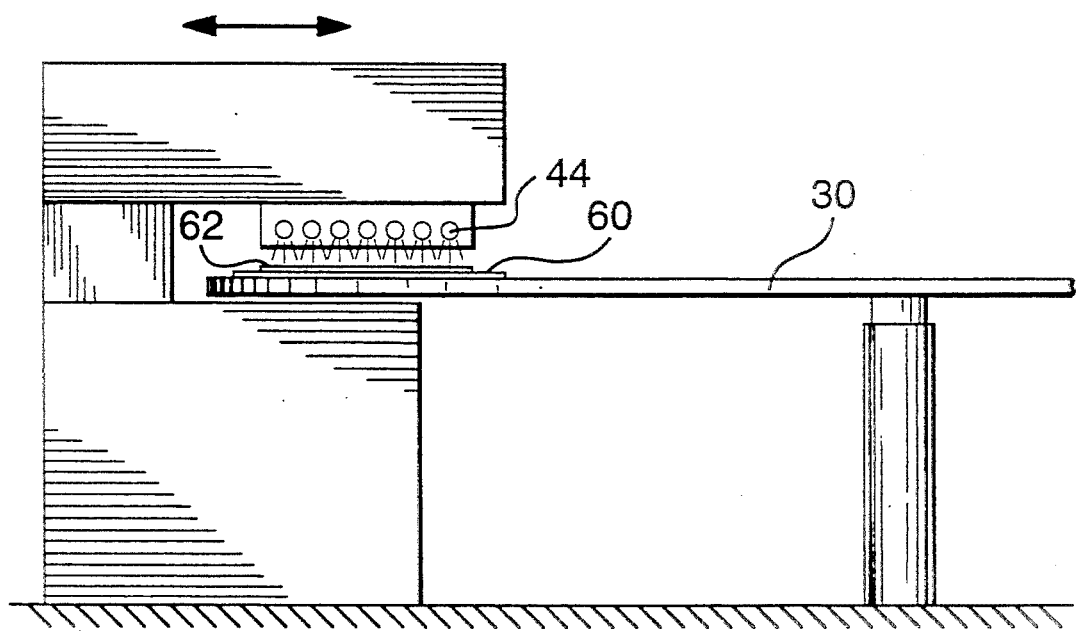
FIG. 19 is a side view of the workstation having the lamps for curing the powder adhesive on the pieces of first material.
Figure 20:
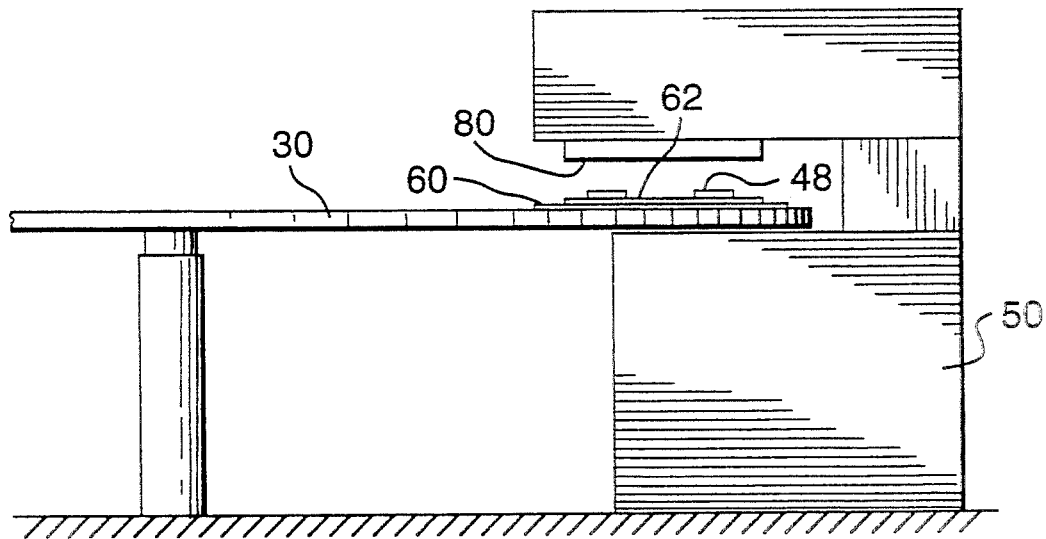
FIG. 20 is a side view of the workstation having the press mechanism, the mechanism being shown in a raised position.

The table 30 is then rotated a further 60°, bringing the fixture 36 carrying the leather pieces 38 with powder adhesive peripheral strips to the next workstation. A bank of lamps 44 for curing the powder adhesive is then moved radially-inward relative to table 30 to extend about 4 inches above fixture 36 at that workstation, as illustrated in FIGS. 13 and 19. The lamps 44 are infrared quartz lamps that take approximately 8 seconds to soften the adhesive powder and make it ready for bonding. The bank of lamps 44 then moves radially outward from table 30.

Figure 7:
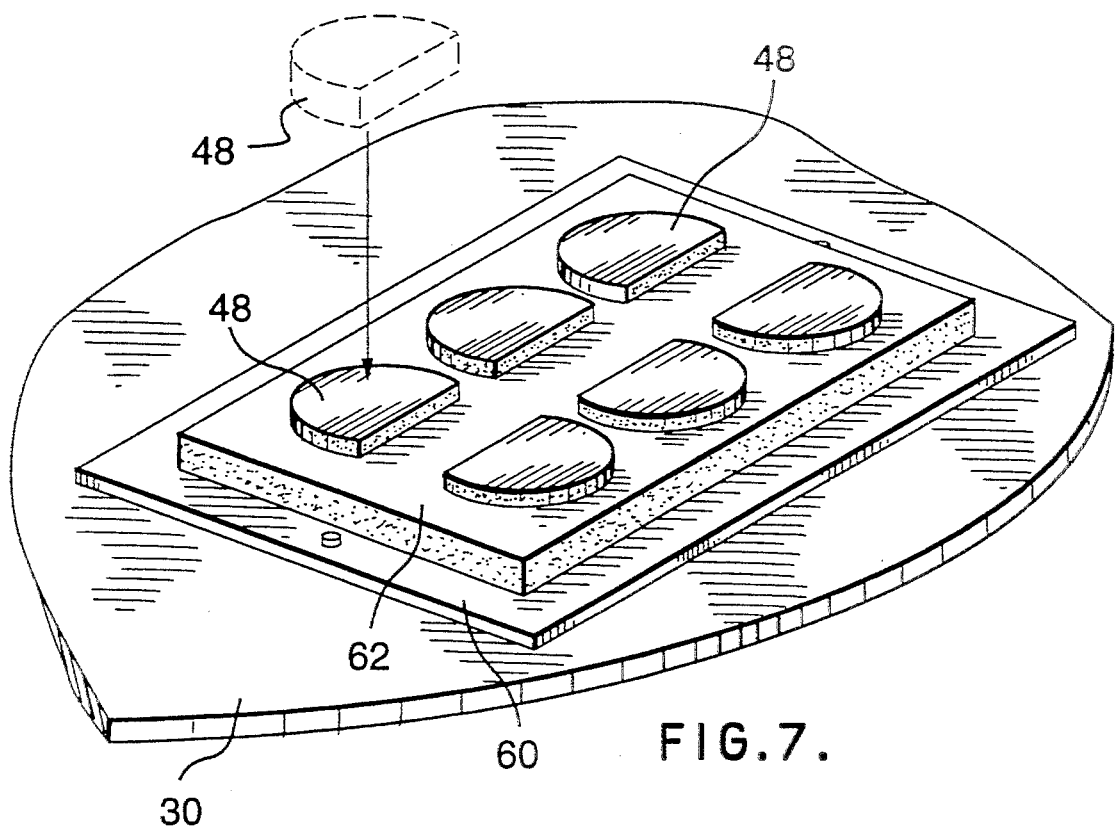
FIG. 7 is a perspective view similar to FIG. 6 but showing the cavities each filled with a piece of the second material after curing of the powder adhesive.
Figure 8:
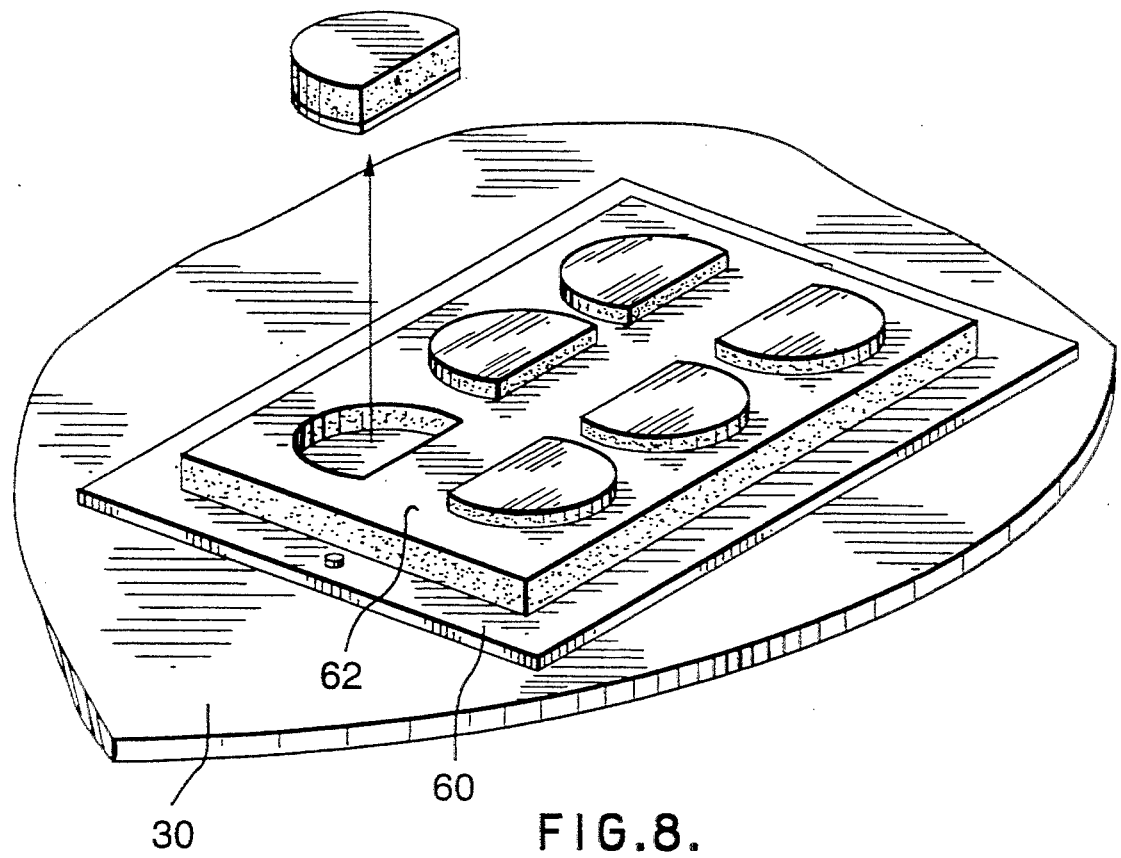
FIG. 8 is a perspective view similar to FIG. 7 but showing a laminated piece being removed from a cavity after pressure has been applied to bond each piece of second material to each piece of first material.
Figure 9:
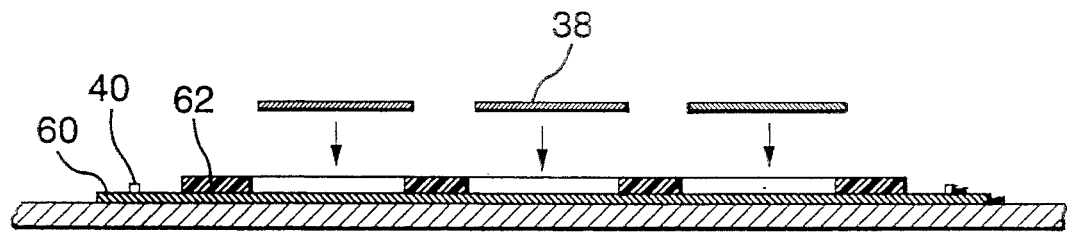
FIG. 9 is a sectioned side view of one of the fixtures, the view showing pieces of the first material ready for placement in cavities of the fixture.
Figure 10:
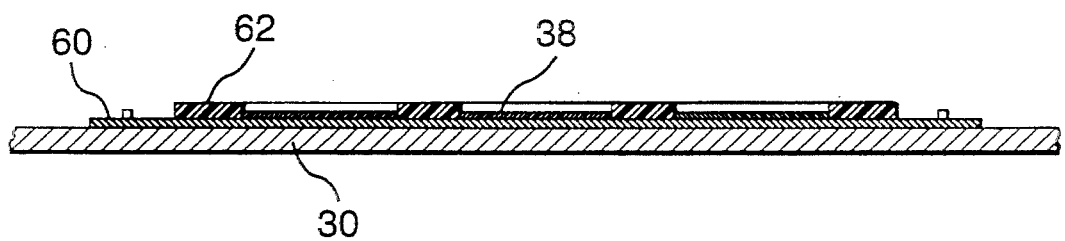
FIG. 10 is a sectioned side view similar to FIG. 9, but showing the pieces of first material resting in the cavities.
Figure 11:
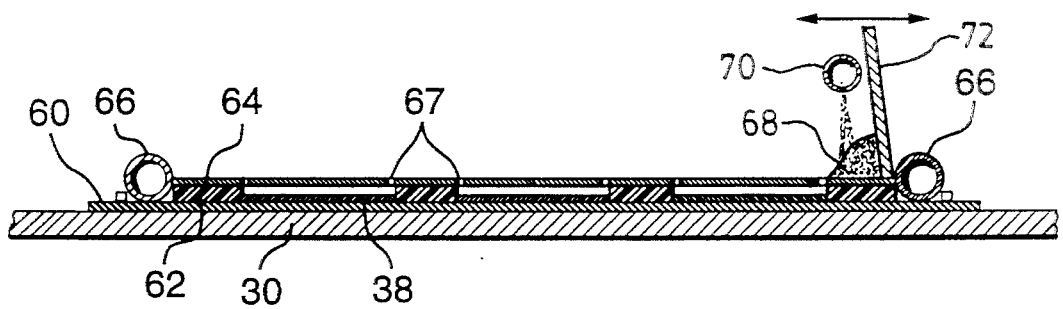
FIG. 11 is a sectioned side view similar to FIG. 10, but additionally showing the powder adhesive screen resting on the fixture.
Figure 12:
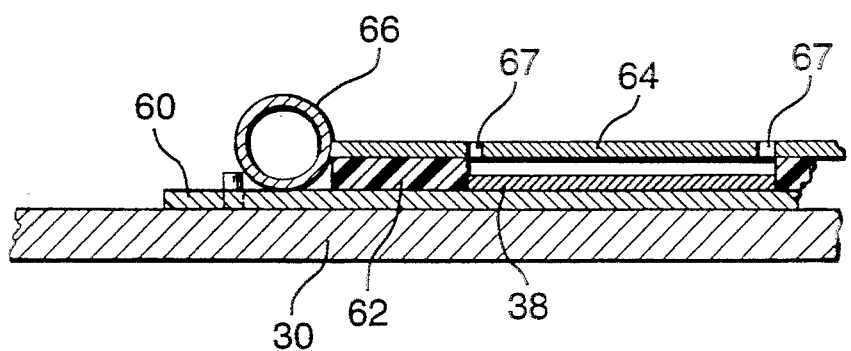
FIG. 12 is an enlarged view of a part of FIG. 11.
Figure 14:
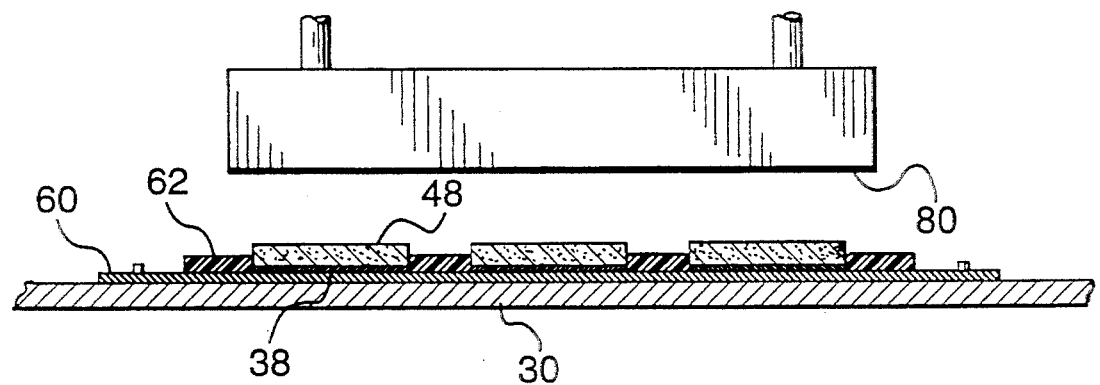
FIG. 14 is a sectioned side view similar to FIG. 10, but also showing pieces of a second material placed onto the pieces of first material, the view further illustrating a press mechanism positioned above the fixture.
Figure 15:
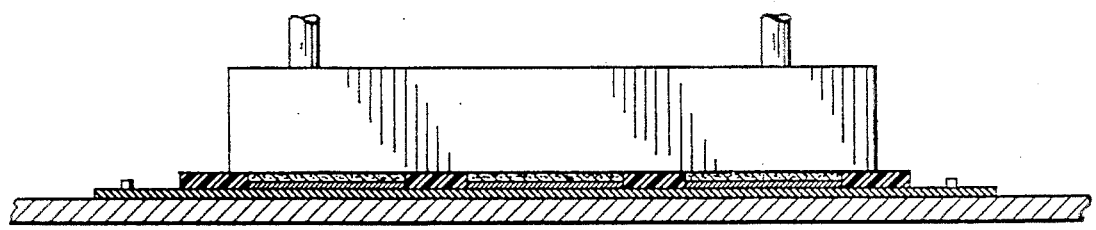
FIG. 15 is a sectioned side view similar to FIG. 14, but showing the press mechanism pressing on pieces of first and second material in the fixture.
Figure 16:
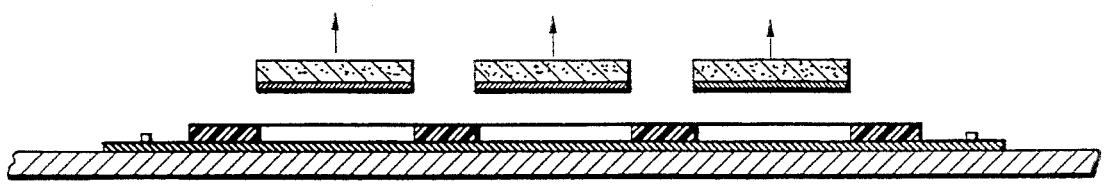
FIG. 16 is a sectioned side view of the fixture of FIG. 15, and showing the laminated pieces of material being removed from the fixture.

A further rotation of 60° of table 30 brings the fixture carrying the leather pieces 38 with softened adhesive on their periphery to the next workstation. A worker 46 places pieces of foam sponge 48 into the six cavities 34 at this location. As with the leather pieces 38, each foam sponge piece 48 is pre-cut to a shape that closely matches the shape of the cavity 34 in which it sits. As shown in FIGS. 7 and 14, after their placement into the cavities 34 the foam sponge pieces 48 extend above the upper surface of the heat-resistant foam sheet 62. The table 30 is then rotated 60° such that fixture 36, now carrying both leather and foam sponge pieces, enters the next workstation.

Figure 21:
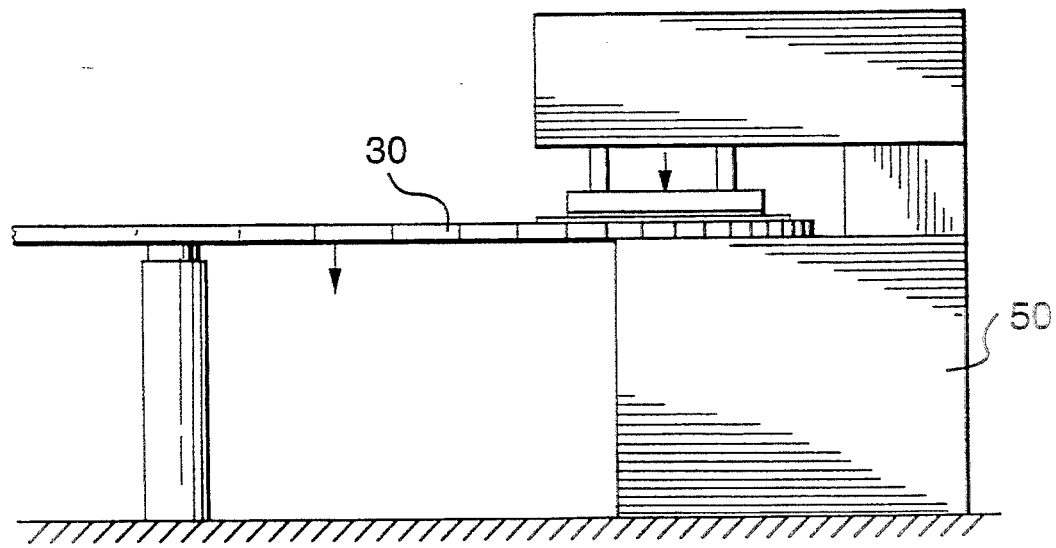
FIG. 21 is a side view of the workstation of FIG. 20, the press mechanism being shown in a lowered position.

A press mechanism 50, illustrated in FIGS. 14, 15, 20 and 21, is located at this workstation. Press mechanism 50 has a press surface 80 that is positioned about 4 inches above the heat-resistant foam sheet 62 at this workstation, and has a similar-sized surface area. As press surface 80 descends, it first contacts the upper surface of the foam sponge pieces 48. As it descends further, press surface 80 compresses the pieces 48 until it comes into contact with the upper surface of foam sheet 62. As shown in FIG. 21, table 30 is pushed downward approximately 0.25 inches until it sits on the bed of press mechanism 50. Press surface 80 is heated, and applies both heat and a pressure of approximately 2 tons for a dwell time of approximately 8 seconds, a time sufficient to firmly bond each leather piece 38 to the corresponding foam sponge piece 48. Non-sticking press surface 80 is then raised, which allows table 30 to rise by 0.25 inches to its normal rotational height. Table 30 is then rotated 60° such that fixture 36 moves into the final workstation, at which the laminated pieces with their edge bonding are removed by worker 52. Once table 30 has been rotated a further 60°, worker 32 is ready to insert a new set of leather pieces 38 into fixture 36.

The foregoing description has followed the steps that are involved with just one of the six fixtures 36 on table 30. It should be recognized that the process of the invention is in fact an overlapping one, in which all the aforementioned steps are happening simultaneously at respective ones of the six fixtures on table 30.

What is claimed as the invention is:

1. A method for laminating one or more pieces of a first material to one or more pieces of a second material having corresponding shapes, the method comprising the steps of:
   (a) placing the one or more pieces of the first material into one of a series of equally-spaced fixtures on a movable work platform, each fixture having a set of recessed areas, one recessed area in each fixture having a shape corresponding to the shape of one of the pieces of the first material;
   (b) depositing a powder adhesive on an edge zone of each of the one or more pieces of the first material;
   (c) curing the powder adhesive with suitable light from a lamp or lamps, the curing transforming the powder adhesive into a state ready for bonding;
   (d) placing the one or more pieces of the second material into the fixture, each piece of the second material being placed onto a piece of the first material having a corresponding shape, the placement being such that the edges of the pairs of pieces are aligned;
   (e) applying a suitable pressure for a suitable time to allow the adhesive on the edge zone of each piece of the first material to bond that piece to the corresponding piece of the second material; and,
   (f) removing the one or more pieces of bonded material from the fixture.

2. A method as in claim 1, wherein each step is performed at a respective one of six workstations equiangularly positioned around a rotatable table carrying six equiangularly-positioned fixtures.

3. A method as in claim 1, wherein step (b) comprises the steps of:
   (i) lowering a mesh screen onto the fixture, the screen having a surface pattern defined by a series of open apertures and blocked apertures, the open apertures being adjacent an edge zone on each of the one or more pieces of the first material; and
   (ii) moving powder adhesive across the top of the lowered mesh screen such that the adhesive drops through the open apertures onto the edge zone of each of the one or more pieces of the first material below.

* * * * *